United States Patent [19]

Cline

[11] Patent Number: 4,671,832
[45] Date of Patent: Jun. 9, 1987

[54] ACCESS FLOOR PANEL WITH EDGE TRIM

[75] Inventor: Stephen D. Cline, Baltimore, Md.

[73] Assignee: Donn Incorporated, Westlake, Ohio

[21] Appl. No.: 776,821

[22] Filed: Sep. 17, 1985

Related U.S. Application Data

[62] Division of Ser. No. 543,508, Oct. 19, 1983, Pat. No. 4,574,555.

[51] Int. Cl.[4] .................. B29C 65/08; B29C 65/44
[52] U.S. Cl. .................. 156/73.1; 52/309.13;
52/475; 52/824; 156/221; 156/290; 156/580.1;
264/23; 264/249
[58] Field of Search .................. 156/73.1, 221, 290,
156/580.1, 580.2, 583.1, 304.2, 304.6; 264/23,
248, 249; 52/741, 309.13, 475, 802, 126.6, 823,
824

[56] References Cited

U.S. PATENT DOCUMENTS

| | | | |
|---|---|---|---|
| 3,303,255 | 2/1967 | Bracey, Jr. | 264/249 |
| 3,396,501 | 8/1968 | Tate | 52/403 |
| 3,799,820 | 3/1974 | Sollerud | 156/304.2 |
| 3,808,075 | 4/1974 | Worley | 156/73.1 |
| 3,833,326 | 9/1974 | Peterson et al. | 264/249 |
| 4,142,341 | 3/1979 | Mott | 52/263 |
| 4,399,491 | 8/1983 | Kackenmeister | 156/73.1 |

Primary Examiner—Michael Wityshyn
Attorney, Agent, or Firm—Pearne, Gordon, McCoy & Granger

[57] ABSTRACT

An access floor panel construction employing peripheral trim channel elements joined together at the panel corners and fixed at their mid-lengths to the edges of a main body. As disclosed, the trim elements are of an organic thermoplastic material and are ultrasonically welded together at their ends and thermoplastically deformed into receiving portions of the main body edges. An assembly fixture holds the trim elements in position for final assembly in a manner which reduces the size of any gaps which might occur as a result of dimensional tolerances in the panel components.

13 Claims, 9 Drawing Figures

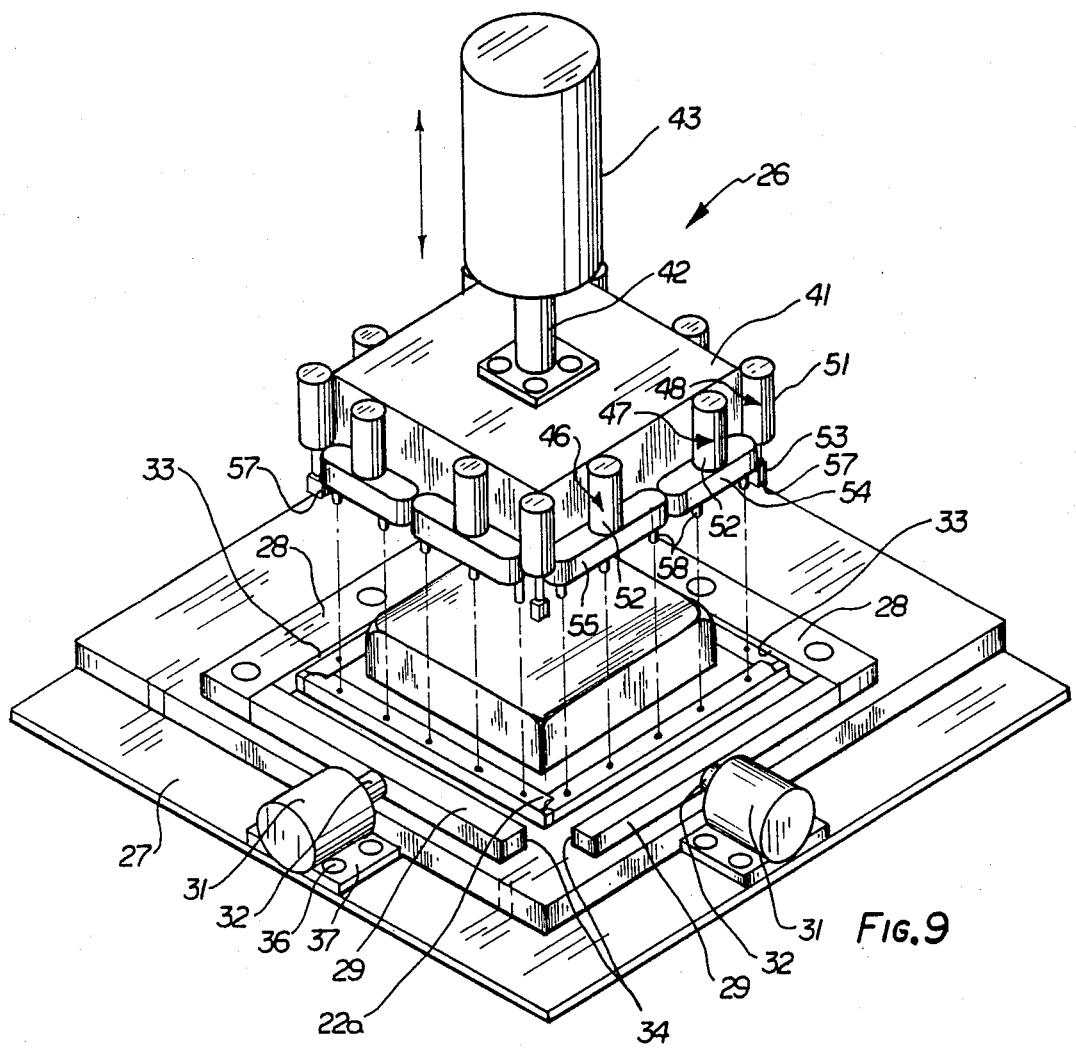
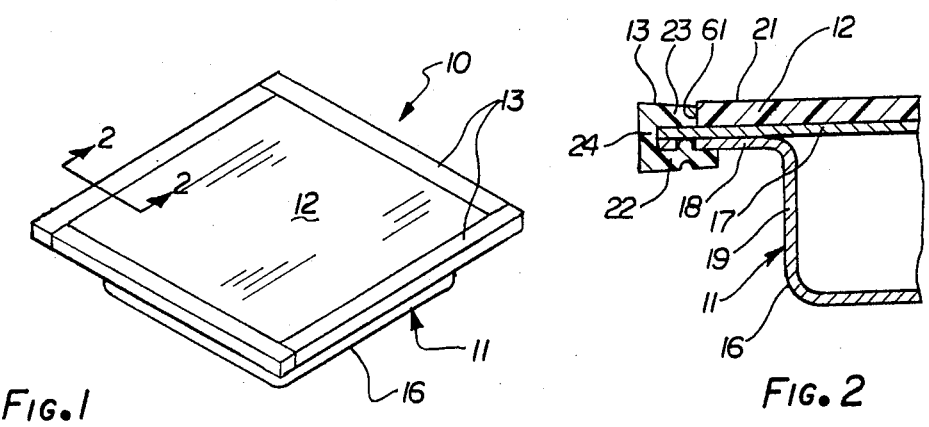

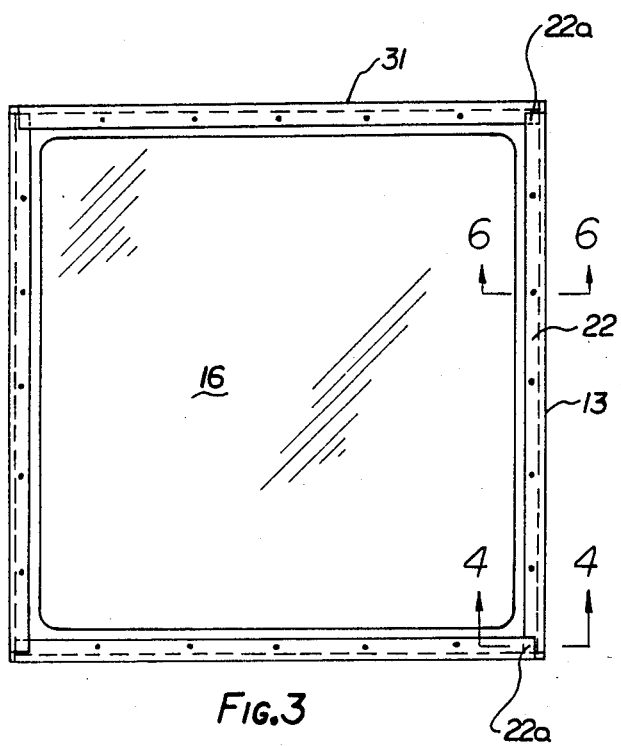
FIG. 3
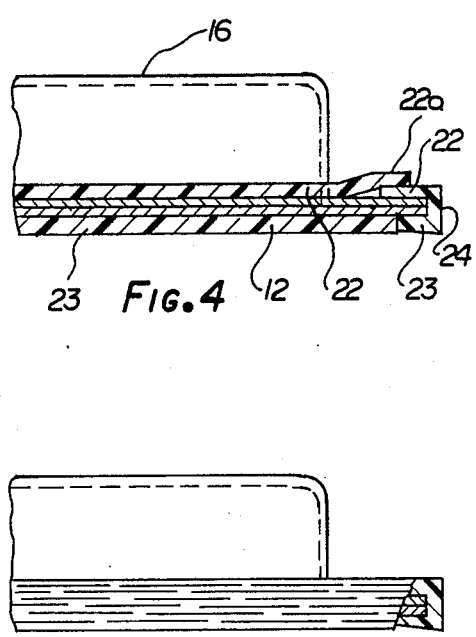
FIG. 4
FIG. 5
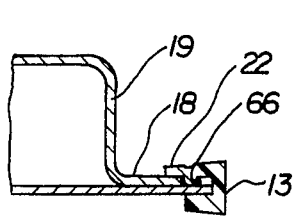
FIG. 6
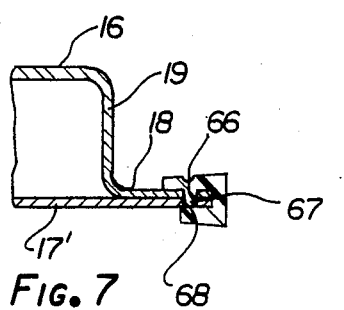
FIG. 7
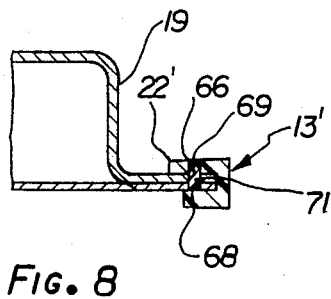
FIG. 8

ACCESS FLOOR PANEL WITH EDGE TRIM

This is a division of application Ser. No. 543,508, filed Oct. 19, 1983, now U.S. Pat. No. 4,574,555.

BACKGROUND OF THE INVENTION

The invention relates to access floor panels and, more particularly, to an assembly of such panels which includes distinct peripheral trim molding.

Prior Art

Access floor panels, ordinarily rectangular, which term as used herein includes square, are used, for example, by arranging them in a rectangular array to provide an elevated floor in rooms where computer equipment is installed. Throughout the lifetime of the floor, individual panels can be temporarily removed to service, repair, or otherwise work on wiring, ducting, or the like lying below the floor. Certain types of known floor panels have peripheral trim or moldings. These trim elements can require special forming techniques, such as molding or stamping, and therefore can be relatively expensive to manufacture and/or assemble.

Typically, an access floor panel has a visible covering in the form of a high pressure plastic laminate, vinyl-reinforced tile, carpeting or the like. In practice, such a cover ordinarily is manufactured with dimensional tolerances that could potentially result in gaps between the cover and the associated perimeter trim. From an appearance standpoint, such gaps are undesirable.

SUMMARY OF THE INVENTION

The invention provides a novel floor panel assembly having perimeter trim that affords improvements in appearance while reducing manufacturing costs. The construction in accordance with the present invention effectively reduces the size, and therefore the conspicuousness, of any gaps between the panel cover and trim. According to the invention, the perimeter trim elements of the panel are assembled around the panel and are then permanently locked in place. The final position of the trim elements relative to the other panel components is determined by an assembly fixture which limits the overall dimension of the final assembly. The trim elements are first located by the fixture and are then fixed in position by locking their corners together and their mid-lengths onto adjacent areas of the panel body. The assembly fixture is arranged to allow the trim elements to float between adjacent edges of the panel covering and fixture. The trim elements are thereby permitted to adjust to the actual size of the panel cover in a manner which tends to divide any dimensional short fall of the cover, within tolerance, into two relatively small and, therefore, inconspicuous gaps, one between the adjacent cover edge and a trim strip and one between the trim strip and fixture.

Ideally, the panel trim elements are plain channels having a generally C-shaped cross section. The plain C-shape configuration readily lends itself to manufacture by extrusion, rolling or like economical fabrication techniques. In assembly with the panel body, the trim channel is slipped over a peripheral flange on the panel body. Preferably, the trim securing operations are performed on the flange of the trim C-section, which is on the reverse or bottom of the panel assembly, so that the original smooth appearance of the front or top face of the trim elements is undisturbed.

In the preferred disclosed embodiment, the trim elements are extrusions of an organic thermoplastic material, such as vinyl. At the corners of the panel, the adjacent ends of the trim elements are thermally fused together at their reverse flanges by ultrasonic welding. In addition, at strategic locations, the lengths of the trim elements at their reverse flanges are plastically deformed into recessed areas of the panel body. As disclosed, this deformation is accomplished by local ultrasonic heating of the reverse trim flanges. In accordance with the invention, the trim is thus joined into a peripherally continuous unit and fixed to the panel body at a multiplicity of points without the use of separate fastening means.

BRIEF DESCRIPTION OF THE DRAWINGS

FIG. 1 is a perspective view of an access floor panel constructed in accordance with the invention;

FIG. 2 is a fragmentary, cross-sectional view of the access floor panel, taken across the plane indicated by the lines 2—2 in FIG. 1;

FIG. 3 is a view of the lower reverse face of the panel assembly prior to completion;

FIG. 4 is a fragmentary view, partly in section, of an edge zone of the access panel assembly taken at the plane indicated at the lines 4—4 in FIG. 3 prior to fusion of adjoining ends of two adjoining trim elements;

FIG. 5 is a fragmentary view similar to FIG. 4, but with only the corner zone of the trim elements in section, and taken after fusion of the adjoining trim ends;

FIG. 6 is a fragmentary, cross-sectional view of the panel assembly taken across the plane indicated by the lines 6—6 in FIG. 3, where the panel trim element has been locally fixed to the perimeter of the panel body;

FIG. 7 is a view similar to FIG. 6 illustrating a modified form of the panel body;

FIG. 8 is a view similar to FIG. 6 illustrating a second embodiment of the invention; and FIG. 9 is a somewhat schematic, perspective view of an assembly fixture in which an access panel is being assembled.

DESCRIPTION OF THE PREFERRED EMBODIMENT

Referring now to the drawings, and in particular to FIGS. 1 and 2, there is shown an access floor panel assembly 10 for use in an elevated floor system. The illustrated panel consists of a main panel body 11, a covering 12, and peripheral trim molding elements 13.

In the illustrated case, the main panel body 11 is a sheet metal fabrication comprising a bottom pan 16 and an upper sheet or plate 17. The bottom pan 16 is stamped or otherwise formed with peripherally outwardly directed flanges 18 that extend along sidewalls 19 and subtend an area substantially equal to that of the top sheet 17. The top sheet is a simple planar metal sheet. The pan 16 and top sheet 17 are permanently assembled, for example, by spot welding the flanges 18 directly to the underside of the top sheet, where, as shown, the pan and top sheet are constructed of steel. In customary fashion, the finished access floor panel 10 is square, with each side, including the trim elements 13, being nominally two feet long.

The cover 12 provides an upper surface 12 which is the visible wear surface of the panel 10. The cover 12, typically, is a high pressure plastic laminate, vinyl-reinforced tile, carpet tile, or other known floor covering. The cover is preferably adhesively fixed to the upper surface of the panel sheet 17 prior to assembly of the trim elements 13. A trim or molding element 13 preferably is formed from a plain extrusion with a generally C-shaped block cross section. A suitable material for the trim 13 is a thermoplastic material, such as vinyl, which has at least some degree of resilience. In the illustrated case, a lower or bottom one of the flanges, designated 22, of the trim C-section is somewhat longer than the other or upper flange, designated 23. A web 24 of the C-section has a length approximately equal to the combined thickness of the pan top sheet 17 and flange 18. In a free state, the cross section of the trim can be arranged so that the flanges 22, 23 converge slightly in a direction away from the web 24 so that when these flanges are assembled over the periphery of the main body 11, they can resiliently grip the surfaces of the pan flange 18 and top sheet 17.

In the illustrated embodiment, the individual trim elements on each edge of the main body 11 are identical. The trim elements 13 are cut in such a manner that the visible upper side (FIG. 1) may give the appearance of a butt joint at each corner of the panel assembly 10. As can be seen from study of the lower half of FIG. 3 and of FIG. 4, the trim elements 13 are cut at one of their ends (arbitrarily termed the "head end" for purposes of this description) across spaced, transverse planes, and at their opposite ("tail") end across a single plane.

The trim elements 13 are assembled around the perimeter of the main panel body 11 and joined head-to-tail. It will be understood that the top sheet 17 and bottom pan 16 have been previously welded together. At each corner of the main panel body 11, the lower flange 22 of the head end of a trim element 13 is slipped over the lower flange 22 of the tail end of the adjacent trim element 13 (FIG. 4).

With the trim elements 13 provisionally assembled on the panel body 11 as just described, these members are positioned in an inverted orientation on a gaging and assembly fixture 26, illustrated in FIG. 9. The fixture 26 comprises a horizontal base 27. Fixed on the base 27 are two elongated side gage blocks 28 precisely disposed at right angles to one another. Another pair of mutually perpendicular blocks 29 are separately slidably mounted on the horizontal base 27. Each of the movable blocks 29 has a linear actuator 31 associated with it. Each actuator 31 has a longitudinally movable shaft 32 fixed to its associated block 29. Upon energization of an actuator 31, its shaft 32 extends horizontally to move the respective block 29 towards an opposite fixed block 28, or retracts horizontally to move its block away from the opposite fixed block.

In the retracted positions of the actuators 31 (illustrated in FIG. 9), the blocks 29 provide sufficient clearance to freely receive the main panel body 11 and trim elements provisionally assembled thereon in a rectangular space bounded by the blocks 28, 29. When the actuators 31 are extended, inner vertical surfaces 33, 34 of the blocks 28, 29 define a precise square, ideally, equal to the exact nominal size of the finished panel assembly 10. The exact extended position of the blocks 29 can be adjusted, for example, by limiting extension of the shafts 32, such as by adjusting the location of the bodies or the actuators 31 and fixing such actuator position by tightening bolts 36 on flanges 37 fixed to the actuators. The actuators 31 can be power driven, for example, pneumatically, hydraulically, or electrically.

Disposed above the fixture base 27 is a trim securing platen 41 of the assembly 26. In the illustrated example, the platen device 41 is suspended on the vertical shaft or rod 42 of an actuator 43. The platen actuator 43, in turn, is fixed relative to the base 27 by a suitable framework (not shown). Operation of the platen actuator 43, powered pneumatically, hydraulically, electrically, or by other suitable means, causes its shaft 42 to be displaced longitudinally along its vertical axis. In a retracted position, as shown in FIG. 9, the platen 41 and elements carried on it are vertically displaced from the base 27 a sufficient vertical distance to allow free movement of the provisionally assembled panel body 11 and trim elements 13 horizontally between the platen-mounted elements and blocks 28, 29.

The platen 41 has a generally rectangular or square configuration corresponding to that of the access floor panel assembly 10. Mounted on the periphery of the platen 41 are a plurality of ultrasonic units 46, 47, and 48. The units 46–48 each include an ultrasonic transducer or generator 51, 52 and a work-engaging tool 53, 54, and 55. At the corners of the platen 41, the work-engaging tool 53 has a relatively broad, flat working surface 57 which lies in a horizontal plane. The corner tools 53 are aligned with, i.e., overlie, the corners of the panel body 11. Along each side of the platen 41, two transducers 51, 52 each drive tools 54, 55 with two or three work-engaging pins 58. Where, as shown, the tools 53–55 are fixed (except for ultrasonic vibrational displacements) on a platen 41, the lower ends of the pins 58 of all of the tools 54, 55 are coplanar, and the working surfaces 57 of the corner tools 53 are likewise coplanar with each other. The work-engaging pins 58 lie in a plane slightly lower than the plane of the corner tool working surfaces 57. As indicated in FIG. 9, the corner tools 53 lie directly over the area in which the trim flanges 22 are overlapped. The tool pins 58 lie over predetermined points along the mid-lengths of the bottom trim flanges 22.

The trim elements or strips 13, already provisionally assembled on the main panel body 11, manually or otherwise as previously described, and loaded on the assembly fixture 26, manually or otherwise, within the space surrounded by the blocks 28, 29, are permanently secured to the panel body 11 in the following manner. In response to actuation by suitable controls (not shown), the actuators 31 are energized to extend their shafts 32, causing the movable blocks 29 to move towards their respective opposed stationary blocks 28 and effectively constrain the trim elements 13. As previously indicated, the movable blocks 29, when extended, define with the stationary blocks 28 a precisely dimensioned cavity, bounded by the vertical block surfaces 33, 34, which is substantially equal to the finished nominal size of the access floor panel assembly 10. Where the cover 12 is undersized but within tolerance, the trim elements 13 will naturally tend to find an average position midway between the adjacent block surfaces 33, 34 and vertical edges 61 of a cover. This floating action of the trim, allowed by limiting the inward extension of the movable blocks 29, tends to average out or reduce any gap which might otherwise exist between the periphery of the cover 12 and confronting portions of the upper flanges 23. It will be understood that the thickness of the trim web 24 in relation to the outside overall length of the top plate 17 and flanges 18 is such that these latter members do not restrict the inward horizontal movement of the trim elements 13 when the movable blocks 29 are closed or extended towards the stationary blocks 28.

With the main panel body 11 and trim molding elements 13 constrained in their desired permanent relation as described above, the platen acutuator 43 is energized to cause the platen 41 to descend until the tools 53-55 engage respective underlying areas of the trim flanges 22. At this time, the ultrasonic transducers 51, 52 are energized to impart sonic energy to the work-engaging tools 53-55. At the corners of the panel body 11, the tool-working surfaces 57 fuse the overlapped flange portion 22a into and flush with the underlying flange 22 of the adjoining trim element 13, as is indicated in the changes in condition of these areas from that illustrated in FIG. 4 to that illustrated in FIG. 5.

Simultaneously with fusion of the trim corners, the work-engaging pins 53 ultrasonically heat and permanently thermoplastically displace local areas of the midsection of the lower flanges 22. With reference to FIGS. 3 and 6, it will be understood that recesses 66 in the form of small, round holes are previously formed in the pan flanges 18. These recesses 66 are in vertical alignment with the work-engaging pins 58 so that material 67 plastically displaced by these pins, upon descent of the platen 41, is received in these recesses 66. The material 67 which projects into the plurality of recesses 66 along a side of the panel body permanently retains the trim 13 on such side precisely at the position at which it is held by the gaging blocks 28, 29.

FIG. 7 illustrates a modification of the invention wherein the top sheet 17' is provided with recesses 68 in the form of circular holes in registration with the holes 66 of the bottom pan 16. In this case, the ultrasonically displaced material 67 is received in both recesses 66, 68, where a more positive locking of the trim elements 13 to the panel body is desired or necessary. To ensure that material of the trim flange 22 is plastically deformed into both recesses 66,68, the workengaging pins 58 can be provided with additional lengths beyond that which is utilized in the arrangement of FIG. 6.

FIG. 8 illustrates another embodiment of the invention. Like the arrangement disclosed in FIG. 7, the bottom pan flanges 18 are provided with holes 66 and the top sheet 17 is provided with aligned holes 68. In this embodiment, unlike the prior described arrangements of FIGS. 6 and 7, the trim elements 13' are formed with apertures 69 aligned with the several holes 66, 68 at each side of the main panel body. Into each of these holes 69, there is assembled a pin 71. The pin 71 can be sized to fit snugly in the panel body holes 66, 68, and the hole 69 in the trim flange 22' can be somewhat oversized. After assembling the main panel body and trim 13', the pins 71, which are formed of a thermoplastic material thermally weldable to that of the trim elements, can be assembled into the holes 66, 68, 69. The pins 71 can have original axial lengths somewhat greater than that illustrated in FIG. 8, so that, upon operation by the work-engaging pins 58 or their equivalent, the pins 71 are expanded in the manner of a rivet to fill the oversized trim flange holes 69 and account for any eccentricities between the pins 71 and the center of the holes 69.

Although the preferred embodiments of this invention have been shown and described, it should be understood that various modifications and rearrangements of the parts may be resorted to without departing from the scope of the invention as disclosed and claimed herein.

What is claimed is:

1. A method of making an access floor panel which comprises the steps of providing a rectangular main body with edges having lengthwise actual dimensions and corners formed by the edges, and a set of four trim elements having ends and lengths corresponding to the dimensions of the edges of the main body and C-shaped cross sections with space between top and bottom flanges to fit over edge portions of the main body, assembling the trim elements around the main body with the top and bottom flanges of each element straddling an associated edge of the main body, locating the trim elements in a rectangular pattern around the main body in a manner that allows the elements to take positions closer to the nominal dimension of the finished panel than is permitted by the actual dimensions of the main body, the bottom flanges of the trim elements thereafter being permanently deformed along their lengths into receiving portions of the main body to permanently lock the trim elements in position on the main body.

2. A method as set forth in claim 1, wherein ends of the trim elements are welded together at the corners of the main body.

3. A method as set forth in claim 2, wherein said trim element ends are thermally welded together.

4. A method as set forth in claim 1, wherein said trim elements are formed of an organic thermoplastic material.

5. A method as set forth in claim 1, wherein said bottom flanges are permanently deformed through application of thermal energy.

6. A method as set forth in claim 1, wherein said trim elements are temporarily constrained by a rectangular fixture to size the assembly of the trim elements and main body while said bottom flanges are being permanently deformed into said main body receiving portions.

7. A method as set forth in claim 6, wherein the ends of said trim elements are thermally welded together while said elements are constrained by said fixture.

8. A method as set forth in claim 12, wherein the bottom flanges are permanently deformed and the ends of said trim elements are welded by ultrasonic tool elements.

9. A method as set forth in claim 8, wherein said ultrasonic tool elements are energized to weld said trim element ends together substantially simultaneously with the permanent deformation of the trim bottom flanges.

10. A method of constructing an access floor panel comprising the steps of providing a substantially planar rectangular main body with peripheral edges and a set of four trim channels in the form of plain extrusions of organic thermoplastic material and of C cross section, positioning the trim channels each on one edge of the main body with portions of such edges being received in a space between top and bottom flanges of the associated trim channel, restricting the positional freedom of the trim channels mounted on the main body by a rectangular assembly fixture having a pair of mutually perpendicular retractable and extendible surfaces adapted to engage the corresponding trim channels, while the trim channels are restricted by the assembly fixture to a predetermined position independent of the actual size of the main body thermally fusing adjacent ends of the trim channels at the corners of the main body and thermoplastically deforming local regions of mid-lengths of the bottom flanges of the trim channels into recesses preformed on the main body adjacent its peripheral edges.

11. A method as set forth in claim 10, wherein said fusing and thermoplastic deformation are performed with ultrasonic tools.

12. A method as set forth in claim 11, wherein said fusing and thermoplastic deformation are accomplished substantially simultaneously.

13. A method as set forth in claim 10, wherein said mutually perpendicular surfaces are limited in their extension towards said main body and channels to a position corresponding substantially to the nominal dimension of the access floor panel whereby said channels are allowed to float between the surfaces of the assembly fixture and the main body to average out dimensional tolerances in components of the main body.

* * * * *

UNITED STATES PATENT AND TRADEMARK OFFICE
CERTIFICATE OF CORRECTION

PATENT NO. : 4,671,832

DATED : June 9, 1987

INVENTOR(S) : Steven D. Cline

It is certified that error appears in the above-identified patent and that said Letters Patent is hereby corrected as shown below:

On the cover page, Section [75] Inventor: should read --Steven D. Cline--.

Column 2, line 64, "12" (second occurrence) should read --21--.

Column 5, line 15, "53" should read --58--.

Column 6, claim 8, line 1, "12" should read --7--.

Signed and Sealed this

Nineteenth Day of January, 1988

Attest:

DONALD J. QUIGG

*Attesting Officer*  *Commissioner of Patents and Trademarks*